July 19, 1938.  W. H. McINTYRE  2,124,403
CONTROL FOR INTERNAL COMBUSTION ENGINES
Filed April 21, 1937    4 Sheets-Sheet 1
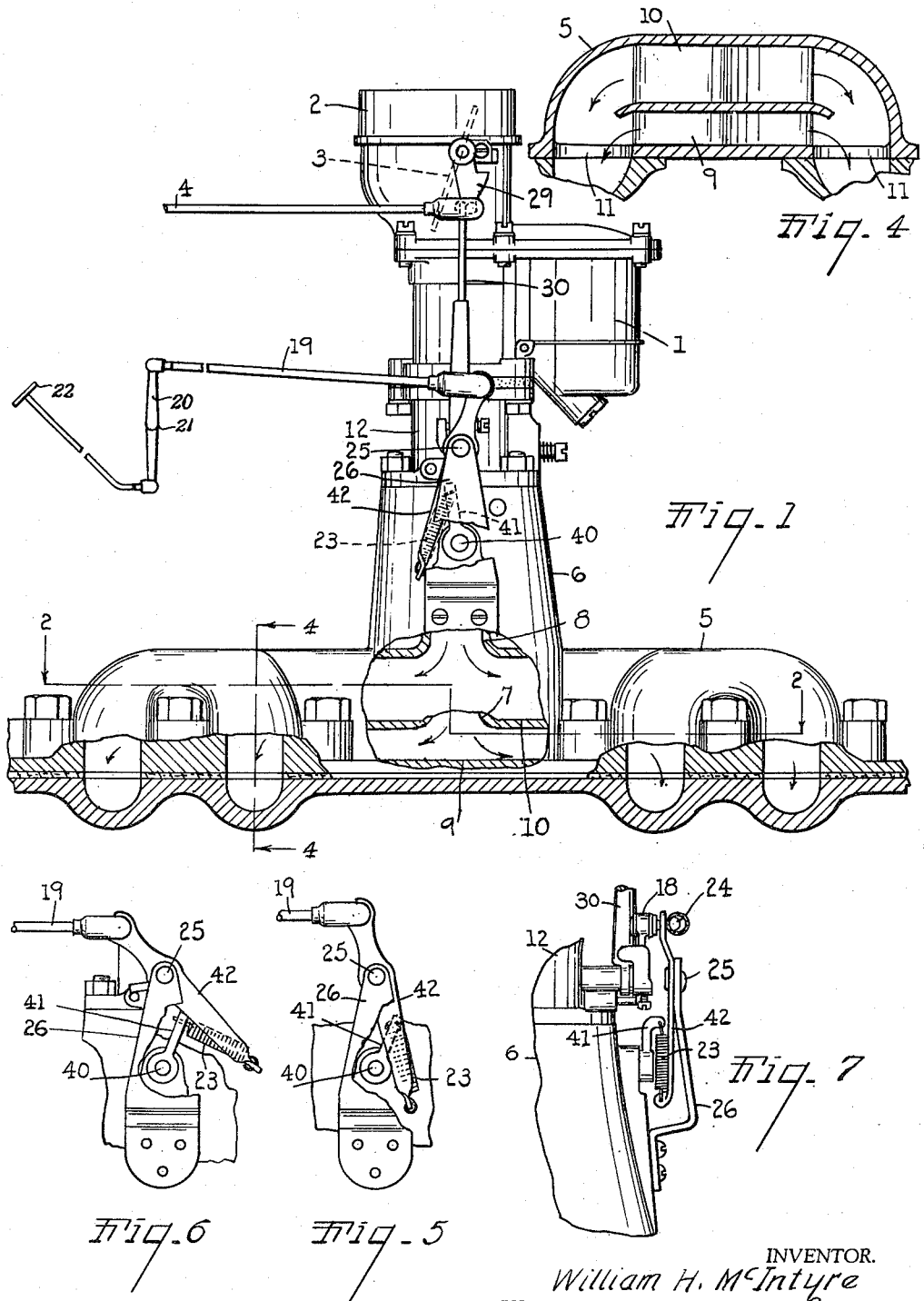
INVENTOR.
William H. McIntyre
BY
Earl T Chappell
ATTORNEYS

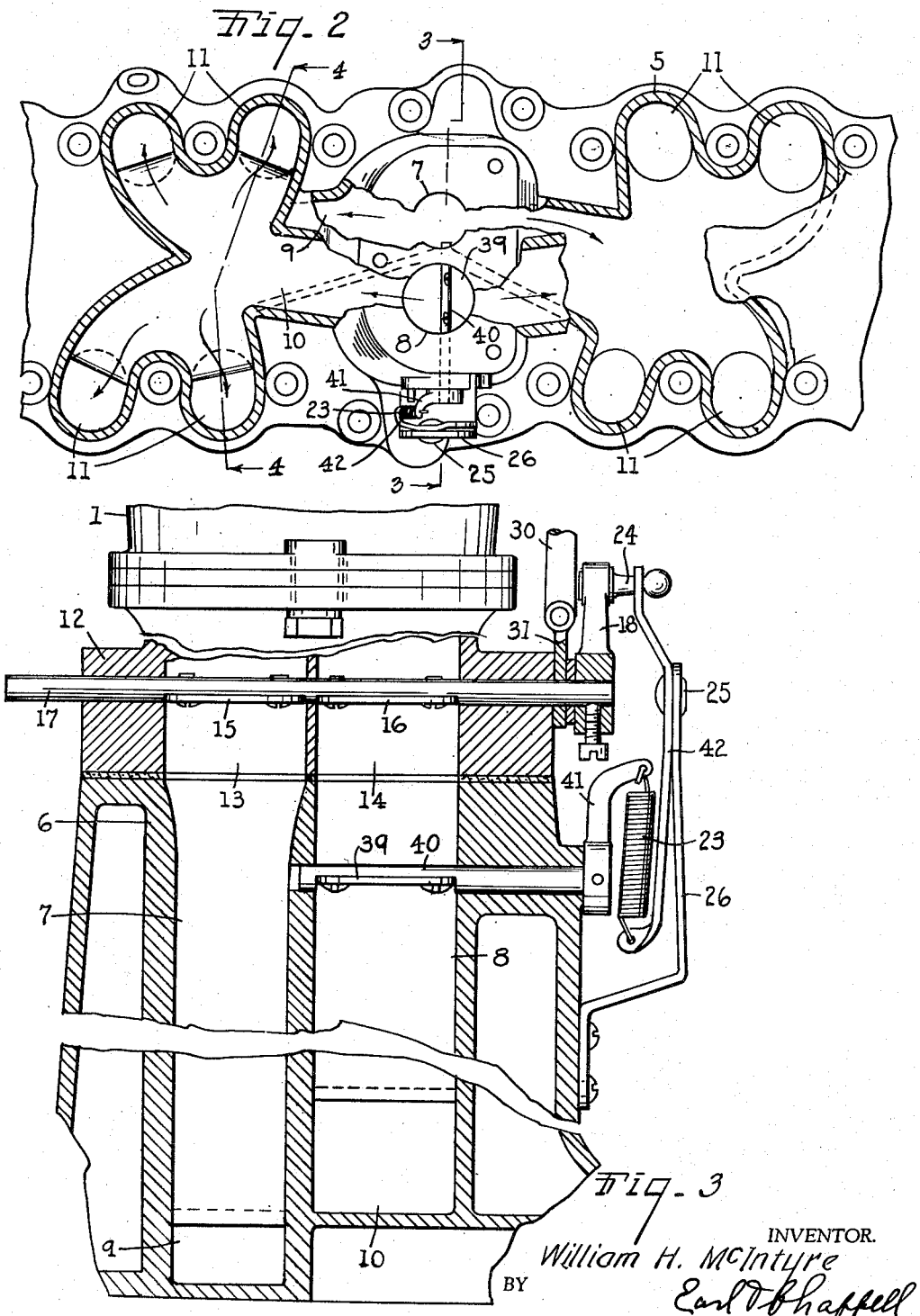

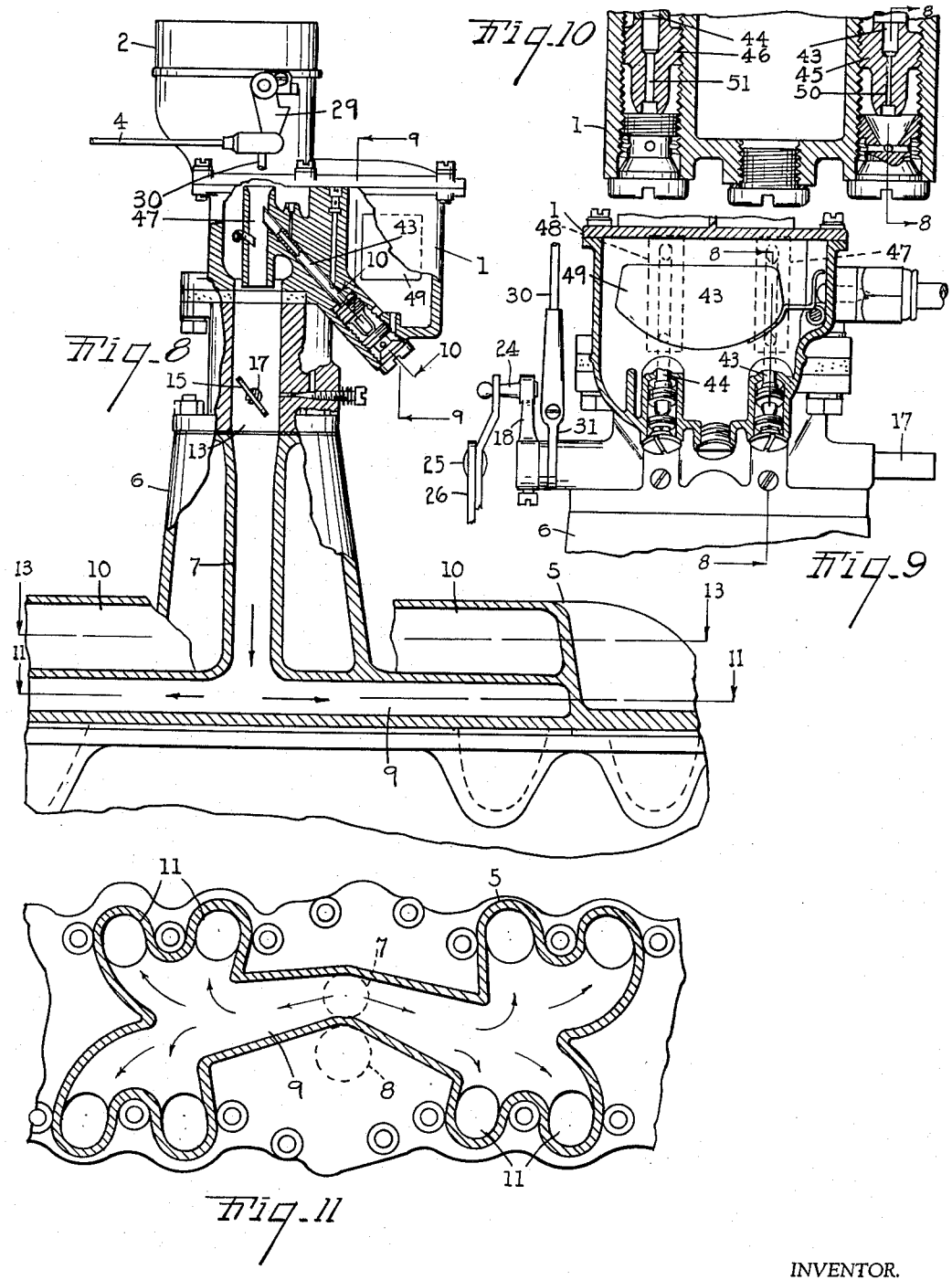

July 19, 1938.  W. H. McINTYRE  2,124,403
CONTROL FOR INTERNAL COMBUSTION ENGINES
Filed April 21, 1937  4 Sheets-Sheet 4

INVENTOR.
William H. McIntyre
BY Earl & Chappell
ATTORNEYS

Patented July 19, 1938

2,124,403

UNITED STATES PATENT OFFICE 2,124,403

CONTROL FOR INTERNAL COMBUSTION ENGINES

William H. McIntyre, Toledo, Ohio

Application April 21, 1937, Serial No. 138,135

15 Claims. (Cl. 123—52)

The main objects of this invention are:

First, to provide a throttle mechanism for internal combustion engines which promotes efficient fuel control throughout a wide range of speeds.

Second, to provide a throttle mechanism for internal combustion engines which results in a substantial fuel saving as well as the maintenance of uniform mixtures throughout a wide range of speeds.

Third, to provide a control mechanism having these advantages which may be readily embodied in or adapted to the fuel feed mechanisms of internal combustion engines now widely used.

Objects relating to details and economies of the invention will definitely appear from the description to follow. The invention is defined in the claims.

A structure which embodies the features of the invention is clearly illustrated in the accompanying drawings, in which:

Fig. 1 is a fragmentary side elevation of a fuel control mechanism embodying the features of my invention, the manifold being partially broken away and partially shown in section.

Fig. 2 is a fragmentary view partially in section on broken line 2—2 of Fig. 1.

Fig. 3 is an enlarged fragmentary view partially in section on line 3—3 of Fig. 2.

Fig. 4 is an enlarged fragmentary section on the broken line 4—4 of Figs. 1 and 2.

Fig. 5 is a fragmentary side elevation illustrating the position of manual control parts when the auxiliary throttle is in open position.

Fig. 6 is a fragmentary view corresponding to that of Fig. 5 showing the manipulation possible for the main throttle valves after the auxiliary throttle is open.

Fig. 7 is a fragmentary view looking from the right of Figs. 1, 5 and 6.

Fig. 8 is a fragmentary view partially broken away and in section on a line corresponding to line 8—8 of Figs. 9 and 10.

Fig. 9 is a fragmentary view in vertical section on line 9—9 of Fig. 8.

Fig. 10 is a fragmentary enlarged view in section on line 10—10 of Fig. 8.

Fig. 11 is a fragmentary view partially broken away and in section on line 11—11 of Fig. 8, illustrating details of my invention and manifold passages in communication with the cylinder block.

Figures 12, 13:
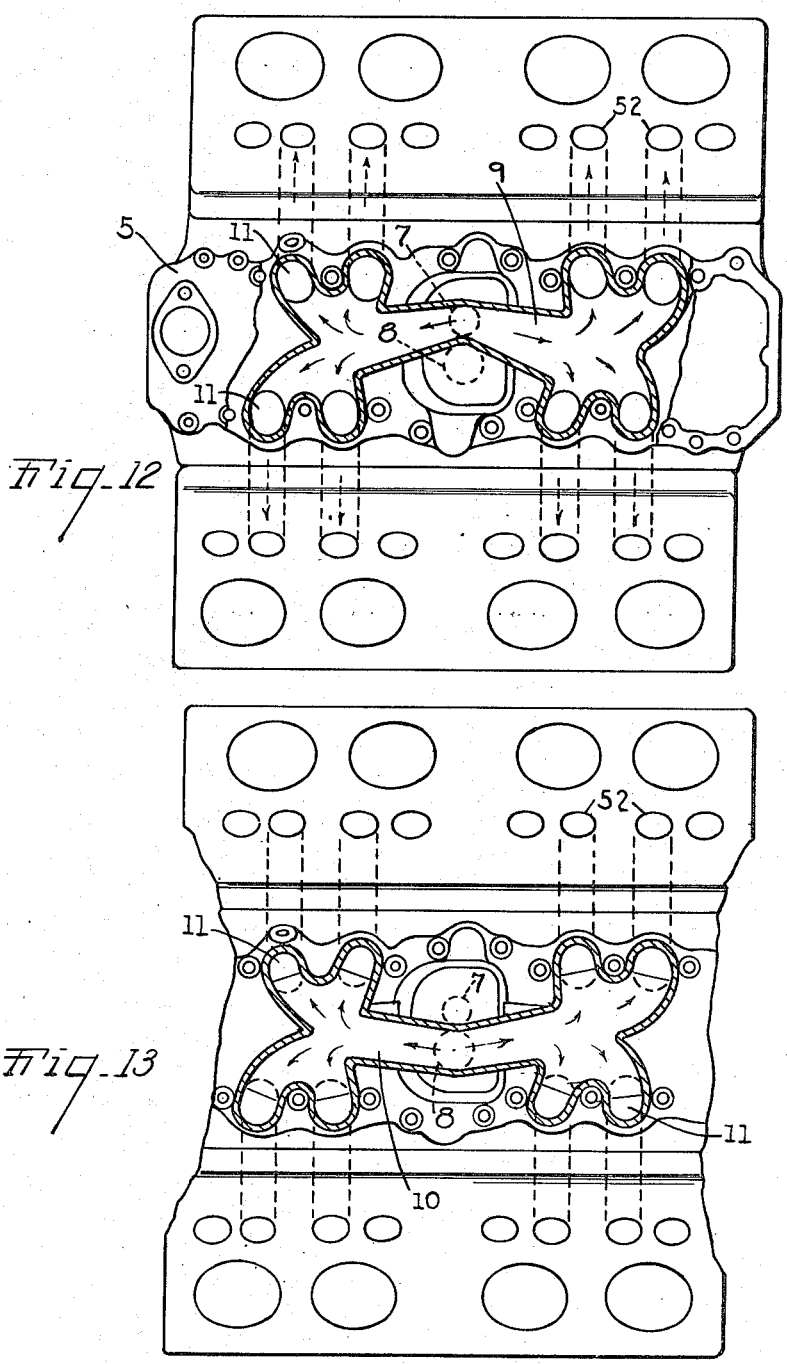
Fig. 12 is a view partially broken away and in horizontal section corresponding to Fig. 11, illustrating my invention as embodied in a V-eight type of engine.
Fig. 13 is a fragmentary view similar to Fig. 12, partially broken away and in horizontal section on line 13—13 of Fig. 8.

Modern internal combustion engines such as are used in automobiles are capable of a wide range of speeds and considerable loss of fuel results in attempting to secure a suitable combustible mixture throughout such wide range. As stated, my main object is to provide efficient performance throughout a wide range and at the same time economize on fuel.

The embodiment of my invention illustrated comprises a down-draft carburetor designated generally by the numeral 1 having air intake 2 provided with a choke 3, the choke control rod being indicated at 4. This carburetor delivers to the manifold designated generally by the numeral 5, the manifold being provided with a neck 6 having passages 7 and 8 therein, both opening to the carburetor. Passage 8 is somewhat larger in cross sectional area than passage 7 and the two passages communicate respectively with the two distributing passages 9, 10 of the manifold, both of which latter passages communicate with the engine cylinders through the ports 11, of which there are eight. The cross sectional area of the passage 10 is preferably substantially greater than that of the passage 9 and that of passage 8 is substantially larger than that of passage 7.

For structural convenience an adapter 12 is disposed between the carburetor 1 and the neck of the manifold. This adapter is provided with passages 13 and 14 registering with the passages 7 and 8 in the neck of the manifold but constituting in effect part of the feed passages 7 and 8. The passages 7 and 8 are provided with throttle valves 15 and 16, respectively, mounted on the common spindle or stem 17 which is provided with an arm 18 on its outer end. This arm is connected by the rod 19 to a suitable manual control lever 20 pivoted at 21 and provided with a foot pedal 22. These manual control parts are shown conventionally without attempting to maintain proportions thereof. It will thus be noted that the throttle valves 15 and 16 are operated together or simultaneously to and from closed position.

I provide the passage 8 with an auxiliary throttle valve 39 which is provided with a spindle or stem 40 having an arm 41 on its outer end. This arm 41 is connected to the lower end of the lever 42 by means of the spring 23, the upper end of the lever being engaged with the coupling member 24 with which the control rod 39 is engaged. This lever 42 is pivoted at 25 on the bracket 26 disposed to project upwardly in the plane of the valve spindle 17.

When the main throttle valves are closed, the arm 18 is in the position shown in Fig. 1. This swings the end of the lever 42 toward the left as viewed in Fig. 1, placing the spring 23 under stress so that the throttle valve 39 is closed and held closed by the tension of the spring. As the main throttle valves are opened the lower end of the lever is swung toward the pivot center or axis of the auxiliary throttle valve, and unless it swings past that center the spring holds the auxiliary valve in closed position. However, when the lower end of the lever swings past the pivot center of the auxiliary valve, the pull of the spring is reversed and it acts to open the auxiliary valve with a snap action which results in the full opening of the auxiliary valve. This is arranged to take place at a predetermined point, for example, at such degree of opening of the main throttles as would result in a speed of thirty-five miles per hour. When this speed is exceeded, the auxiliary throttle is opened so that both passages are open for the delivery of fuel to the manifold under the control of the main throttle. As soon as the main throttle valves are closed to such point as would reduce the speed of the vehicle below thirty-five miles per hour, for example, the auxiliary throttle valve is again closed so that the entire supply of fuel passes to the manifold and thence to the engine through the passage 7 and the connected passage of the manifold.

I have found that when the engine is operating at a speed below, for example, thirty-five miles per hour, the manifold arrangement as above described renders it unnecessary to supply a proportionate amount of fuel as compared to operation at higher speed. Therefore, my invention contemplates provision of means whereby only sufficient fuel is fed by the carburetor to satisfy the load requirement when the auxiliary throttle valve 39 is closed. I have illustrated these provisions in connection with a carburetor of a known type comprising a pair of jets 43, 44 adjustably mounted in known manner in cores 45, 46 respectively, threadedly associated with the carburetor housing. Jet 43 communicates at its open end with a throat 47 open to or communicating with the manifold passage 7 and jet 44 communicates at its open end with a similar throat 48 open to or communicating with manifold passage 8. The said jets are fed with fuel in known manner by the carburetor which is controlled by float 49.

Referring to Fig. 10, I provide jet 43 with a restricted internal passage or bore 50 through which the fuel flows, the bore 50 being of substantially smaller cross sectional area than bore 51 of the jet 44.

By the foregoing provisions, I substantially reduce fuel consumption by eliminating the supply of entirely superfluous fuel at low speed operating conditions. At the same time, the fuel supply through bore 50 to throat 47 is ample to insure sufficient fuel vapor being furnished to the cylinders to enable the engine to be readily started and operated at low speeds and diminishes the danger of flooding the engine during starting. Bore 51 may, of course, be proportioned as desired to take care of the engine fuel requirements at high operating speed.

The proportioning of passages 7, 8 and 9, 10 as indicated insures that the proper amount of fuel, as determined by the jets, reaches the cylinders both under low and high speed operating conditions.

Reference to Figs. 12 and 13 clarifies the arrangement of manifold passages 9, 10 in relation to the cylinder block passages 52 of a V type of engine. It will, of course, be understood that the type of internal combustion engine with which my provisions are associated is in no way restrictive of my invention, which concerns itself solely with improvements in carburetor and manifold construction.

With this arrangement of parts, I substantially increase the efficiency of the engine both in the matter of fuel consumption and in performance under the varying speeds. The single passage is sufficient to supply combustible mixture for the lower speeds and it is under the control of the throttle up to the maximum which may be determined upon, at which point the auxiliary valve is opened and both passages are open for the delivery of fuel, still subject, however, to the control of the main throttle.

In the embodiment illustrated, the choke valve valve lever 29 acts upon the arm 30 which is connected at 31 to the spindle 17 so that the main throttle valves are slightly opened when the choke is closed or moved toward closed position. This detail forms no part of my present invention.

I have illustrated and described my improvements as I have embodied them for use in an eight cylinder internal combustion engine. I have not attempted to illustrate and describe other embodiments or adaptations thereof as it is believed that this disclosure will enable those skilled in the art to embody my invention as may be desired.

Having thus described my invention what I claim as new and desire to secure by Letters Patent is:

1. The combination with a double passage internal combustion engine manifold, of a carburetor, separate feed passages connecting said carburetor to the passages of the manifold, main throttle valves for said feed passages provided with a common spindle, the valves being disposed on said spindle so that they they are simultaneously moved to and from closed position, an arm on said spindle, a manually actuated throttle control means connected to said arm, an auxiliary throttle valve in one of said feed passages disposed at the rear of the main throttle valve therein, a spindle for said auxiliary throttle valve, an arm on said auxiliary throttle valve spindle, a pivoted lever connected to said arm on said main throttle valve spindle to be actuated therewith and disposed at the side of the said arm on said auxiliary throttle valve spindle to swing across the plane of the axis thereof, and a coiled spring connecting said arm on said auxiliary valve spindle with the free end of said lever whereby on the actuation of the main throttle valve spindle beyond a predetermined point in either direction the auxiliary throttle will be opened or closed with a snap action, the feed passage provided with the auxiliary valve being of a greater capacity than that of the other passage.

2. The combination with a double passage internal combustion engine manifold, of a carburetor, separate feed passages connecting said carburetor to the passages of the manifold, main throttle valves for said feed passages provided with a common spindle, the valves being disposed on said spindle so that they are simultaneously moved to and from closed position, an arm on said spindle, a manually actuated throttle control means connected to said arm, an auxiliary throttle valve in one of said feed passages disposed at the rear of the main throttle valve therein, a spindle for said auxiliary throttle valve, an arm on said auxiliary throttle valve spindle, a pivoted lever connected to said arm on said main throttle valve spindle to be actuated therewith and disposed at the side of said arm on said auxiliary throttle valve spindle to swing across the plane of the axis thereof, and a coiled spring connecting said arm on said auxiliary valve spindle with the free end of said lever whereby on the actuation of the main throttle spindle beyond a predetermined point in either direction the auxiliary throttle will be opened or closed with a snap action.

3. The combination with an internal combustion engine manifold, of a carburetor, separate feed passages connecting said carburetor to the manifold, main throttle valves for said feed passages operatively connected so that they are simultaneously moved to and from closed position, a manually actuated control means for said main throttle valves including a pivoted arm, an auxiliary throttle valve in one of said feed passages disposed at the rear of the main throttle valve therein, operating means for said auxiliary throttle valve including a pivoted arm, a pivoted lever connected to said first-named arm to be actuated thereby, and a tension spring connected to said second-named arm and to the free end of said lever whereby on the actuation of the main throttle valve beyond a predetermined point in either direction the auxiliary thottle valve will be opened or closed with a snap action, the feed passage provided with the auxiliary throttle being of greater capacity than that of the other passage.

4. The combination with an internal combustion engine manifold, of a carburetor, separate feed passages connecting said carburetor to the manifold, main throttle valves for said feed passages operatively connected so that they are simultaneously moved to and from closed position, a manually actuated control means for said main throttle valves including a pivoted arm, an auxiliary throttle valve in one of said feed passages disposed at the rear of the main throttle valve therein, operating means for said auxiliary throttle including a pivoted arm, a pivoted lever connected to said first-named arm to be actuated thereby, and a tension spring connected to said second-named arm and to the free end of said lever whereby on the actuation of the main throttle valve beyond a predetermined point in either direction the auxiliary throttle valve will be opened or closed with a snap action.

5. The combination with an internal combustion engine manifold, of a carburetor, separate feed passages connecting said carburetor to the manifold, main throttle valves for said feed passages operatively connected so that they are simultaneously moved to and from closed position, a manually actuated control means for said main throttle valves including a pivoted arm, an auxiliary throttle valve in one of said feed passages disposed at the rear of the main throttle valve therein, operating connections for said auxiliary throttle to said control means whereby on the actuation of the main throttle valve beyond a predetermined point in either direction the auxiliary throttle valve will be opened or closed with a snap action, the feed passage provided with the auxiliary throttle being of greater capacity than that of the other passage.

6. The combination with an internal combustion engine manifold, of a carburetor, separate feed passages connecting said carburetor to the manifold, main throttle valves for said feed passages operatively connected so that they are simultaneously moved to and from closed position, a manually actuated control means for said main throttle valves including a pivoted arm, an auxiliary throttle valve in one of said feed passages disposed at the rear of the main throttle valve therein, operating connections for said auxiliary throttle to said control means whereby on the actuation of the main throttle valve beyond a predetermined point in either direction the auxiliary throttle valve will be opened or closed with a snap action.

7. The combination with a carburetor provided with a plurality of delivery passages, main throttle valves for said passages operatively connected so that they are simultaneously moved to and from closed position, manually actuated control means for said main throttle valves, an auxiliary throttle valve in one of said passages disposed at the rear of the main throttle valve therein, and operating connections for said auxiliary throttle valve to said main throttle valves including a lever actuated by the operation of said main throttle valve and a spring connection for said lever to said auxiliary throttle valve positioned so that the auxiliary throttle valve is held in closed position when the main throttle valves are closed and remains in closed position until a predetermined point in the opening of the main throttle valves has been reached, and is then actuated to fully open position and remains in fully opened position during a continued operation of the main throttle valves and until in their closing movement they pass the said predetermined point.

8. The combination with a carburetor provided with a plurality of delivery passages, main throttle valves for said passages operatively connected so that they are simultaneously moved to and from closed position, manually actuated control means for said main throttle valves, an auxiliary throttle valve in one of said passages disposed at the rear of the main throttle valve therein, and operating connections for said auxiliary throttle valve to said control means and acting to hold said auxiliary throttle valve in closed position when the main throttle valves are closed and remains in closed position until a predetermined point in the opening movement of the main throttle valves has been reached, and is then actuated to fully open position and remains in fully opened position during a continued operation of the main throttle valves and until in their closing movement they pass the said predetermined point.

9. The combination with a carburetor provided with separate delivery passages, of main throttle valves operatively connected for simultaneous operation, a manually actuated means for operating said valves, an auxiliary throttle valve for one of said passages disposed at the rear of the main throttle valve therein, and operating connections for said manual control means to said main throttle valves and to said auxiliary throttle valve whereby the auxiliary throttle valve is fully opened when the main throttle valves are opened to a predetermined degree and fully closed on the passing of said point on the closing movement of the main throttle valves.

10. The combination of a carburetor provided with separate delivery passages of smaller and larger cross sectional area and separate jets communicating with said passages, of main throttle valves in said passages connected for simultaneous operation, means for operating said valves, an auxiliary throttle valve for the larger of said passages, the carburetor jet communicating with the smaller of said passages having a restricted throat as compared to that of the jet for the larger passage, and operating connections from said main valve operating means to said auxiliary throttle valve whereby said auxiliary valve is fully opened upon the opening of the main valves beyond a predetermined degree, said restricted jet throat feeding fuel through said smaller passage while said auxiliary valve is closed.

11. The combination of a carburetor provided with separate delivery passages and separate jets communicating with said passages, of main throttle valves in said passages, means for operating said valves, an auxiliary throttle valve for one of said passages, the carburetor jet communicating with the other of said passages having a restricted throat as compared to that of the jet for the passage wherein the auxiliary throttle valve is located, and operating connections from said main valve operating means to said auxiliary throttle valve whereby said auxiliary valve is opened upon the opening of the main valves beyond a predetermined degree, said restricted jet throat feeding fuel through said other of said passages while said auxiliary valve is closed.

12. The combination with a double passage internal combustion engine manifold having delivery ports common to both passages, one of said manifold passages being of substantially greater cross sectional area than the other, of a carburetor provided with separate delivery passages communicating with said manifold passages and provided with independent fuel jets, said carburetor passages being of different cross sectional areas with the larger delivering to the larger manifold passage and the smaller delivering to the smaller manifold passage, main throttle valves for said carburetor passages connected for simultaneous operation, an auxiliary throttle valve for the larger of said passages disposed at the rear of the said main throttle valve thereof, the carburetor jet of the smaller of said carburetor passages having a restricted throat as compared to the throat of the jet communicating with the larger carburetor passage, operating means for said main throttle valves, and operating connections for said main throttle valve operating means to said auxiliary throttle valve whereby said auxiliary valve is fully opened upon the opening of the main throttle valves beyond a predetermined point and is fully closed when the main throttle valves pass that point on the closing movement thereof.

13. The combination with a double passage internal combustion engine manifold having delivery ports common to both passages, of a carburetor provided with separate delivery passages communicating with said manifold passages and provided with independent fuel jets, main throttle valves for said carburetor passages connected for simultaneous operation, an auxiliary throttle valve for one of said passages disposed at the rear of the said main throttle valve thereof, operating means for said main throttle valves, and operating connections for said main throttle valve operating means to said auxiliary throttle valve whereby said auxiliary valve is fully opened upon the opening of the main throttle valves beyond a predetermined point and is fully closed when the main throttle valves pass that point on the closing movement thereof.

14. In combination with a carburetor having separate delivery passages of different diameter, a first throttle valve in the smaller of said passages, means for manually actuating said valve, a second throttle valve in the larger of said passages, lost motion snap means operatively connected to said first valve for fully opening said second valve when said first valve is opened to a predetermined degree and for fully closing said second valve when said first valve is closed beyond a predetermined point in its closing movement, and a manifold operatively connected to said carburetor and having passages of different size in line with said carburetor passages.

15. In combination with a carburetor having separate delivery passages, a first throttle valve in one of said passages, means for manually actuating said valve, a second throttle valve in the other of said passages, lost motion means operatively connected to said first valve for immediately and fully opening said second valve when said first valve is opened to a predetermined degree and for fully closing said second valve when said first valve is closed beyond a predetermined point in its closing movement, and a manifold operatively connected to said carburetor.

WILLIAM H. McINTYRE.